United States Patent [19]

Bostica et al.

[11] Patent Number: 5,596,664
[45] Date of Patent: Jan. 21, 1997

[54] TRANSMITTER MODULE FOR OPTICAL INTERCONNECTIONS

[75] Inventors: Bruno Bostica, Pino Torinese; Franco Delpiano, Collegno; Luca Pesando, Bussoleno, all of Italy

[73] Assignee: CSELT-Centro E Laboratori Telecomunicazioni S.p.A., Turin, Italy

[21] Appl. No.: 531,244

[22] Filed: Sep. 20, 1995

[30] Foreign Application Priority Data

Sep. 29, 1994 [IT] Italy .................... TO94A0757

[51] Int. Cl.⁶ ...................................... G02B 6/421
[52] U.S. Cl. .................. 385/92; 385/88; 385/91; 359/163
[58] Field of Search ................ 385/92, 88–91, 385/93, 94; 359/180, 181, 188, 162, 163; 250/227.14, 227.15, 227.17, 227.24; 257/99, 100

[56] References Cited

U.S. PATENT DOCUMENTS 4,744,626  5/1988  Mery .......................... 385/94 X
4,802,178  1/1989  Ury ............................ 372/36

FOREIGN PATENT DOCUMENTS 0243057  10/1987  European Pat. Off. .
2503458  10/1982  France .
8234091   4/1986  Germany .
56-85882  7/1981  Japan ......................... 385/88
2230647   2/1990  United Kingdom .

OTHER PUBLICATIONS

"IBM ENTERPRISE SYSTEMSMULTIMODE", N. R. Aulet, IBM J. Res. Develop. vol. 36 No., 4 Jul. 1992, pp. 553–575.

Primary Examiner—Phan T. H. Palmer
Attorney, Agent, or Firm—Herbert Dubno

[57] ABSTRACT

Transmitter module for optical interconnections, comprising a metal container housing an optical emitting device, an integrated circuit containing the driving circuit of the emitting device and an optical fibre extending outside the container, the emitting device being mounted on a metallic ground area realized on the integrated circuit. The cathode is electrically connected to the ground area and the anode is connected to a second metal area, connected with the output of the driving circuit. The module uses a type of assembly which minimises problems due to the length of the connecting wires, to parasitic effects and to the effects of signal reflections due to impedance mismatching. It also requires reduced power for its operation and it is provided with a structure facilitating dissipation.

4 Claims, 1 Drawing Sheet

TRANSMITTER MODULE FOR OPTICAL INTERCONNECTIONS

FIELD OF THE INVENTION

Our present invention relates to optical fiber telecommunications systems and more particularly to a transmitter module for optical interconnections.

BACKGROUND OF THE INVENTION

It is well known that the "optical" approach to the problem of interconnecting different elements of a telecommunications systems or, more generally of data transmission systems, provides a solution to rate, cross-talk and impedance mismatching problems, which constitute limitations of interconnection techniques for electrical carriers.

The elements required to build an optical interconnection are the transmitter, the receiver and the transmission medium connecting them. Inside the transmitter there is a source of light radiation, made by a solid state device (a laser or a LED), which is associated with an electronic circuit arranged to control its operation. Transmission of the light emitted by the optical source is, in most cases, entrusted to an optical fiber, which must be accurately coupled with the emitting device in order to maximize the radiation collection efficiency.

Perfect coupling must be maintained throughout the operating time of the interconnection and therefore it must be accomplished with a technique that will guarantee its stability in the presence of thermal or mechanical disturbances. For this reason it is common practice to equip the transmitter with a length of optical fiber, called a pig tail, firmly secured so as to guarantee coupling optimisation and stability. The end of the pig tail is secured with the most suitable technique to the actual transport fiber.

Problems of impedance mismatching and of parasite couplings also affect the electrical connections inside the transmitter, between the driving circuit and the optical emitting device. These problems add to those of size, which must be kept to a minimum, and of dissipation of the power generated by the emitting device and by the driving circuit, which dissipation must be adequately controlled in order to guarantee the operating stability of the transmitter as a whole.

A known method of assembling the driving circuit and the laser (or LED) inside a transmission module is described in the article "IBM Enterprise Systems multimode fiber optic technology", by N. R. Aulet et al, IBM J. Res. Develop. Vol. 36, no. 4, pages 553–575, 4 Jul. 1992. According to this method, the integrated circuit driving the laser and the laser itself are housed on a common support, which may be a wafer, for instance made of ceramic material or silicon, and are connected to each other by means of a wire bonded at its ends on metal areas provided on the devices themselves for this purpose, according to the technique known as "wire bonding".

This solution does not allow reducing the distances of the connections below a certain measure and requires a total mounting area that is substantially larger than the area of just the integrated circuit containing the laser driving circuit. Moreover, aligning the emitting device with the optical fiber requires additional space for assembly operations, which are complex and laborious.

OBJECTS OF THE INVENTION

It is the principal object of the present invention to provide an improved transmitter module for optical interconnections.

Another object is to provide a transmitter module for the purposes described which obviates drawbacks of earlier systems.

SUMMARY OF THE INVENTION

These drawbacks are obviated by the transmitter module for optical interconnections according to the present invention, which uses an assembly by means of which the problems due to the length of the bonding wires through several connection sections realized with different techniques are minimized, and in which assembly times, parasite effects and signal reflection effects caused by impedance mismatching are reduced. The module requires reduced power for its operation and it is provided with a structure facilitating dissipation.

More particularly, the present invention provides a transmitter module for optical interconnections, comprising a metal container housing an optical emitting device having an anode and a cathode, an integrated circuit containing the driving circuit of the optical emitting device and an optical fiber outgoing from the module through a fiber guiding device. According to the invention the optical emitting device is mounted on a first metallic ground area provided on the integrated circuit and has the cathode electrically connected to the first area and the anode connected to a second metal area, connected with the output of the driving circuit, the optical fiber facing the light-emitting surface of the optical emitting device and being secured on the integrated circuit.

BRIEF DESCRIPTION OF THE DRAWING

The above and other objects, features, and advantages will become more readily apparent from the following description, reference being made to the accompanying drawing in which:

SPECIFIC DESCRIPTION

Figure 1:
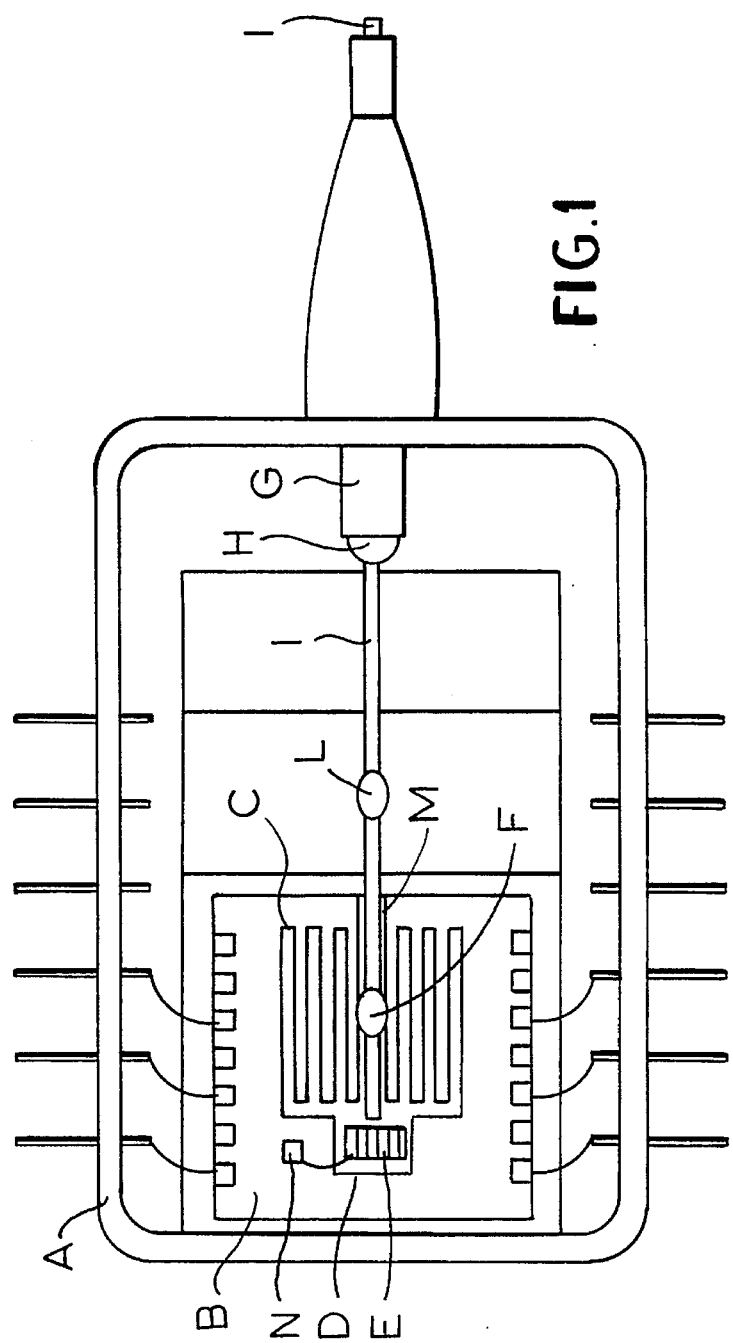

In FIG. 1, a metal container A, of the "flat pack" type, which is to contains and affords mechanical protection to the assembly, and also acts as an electromagnetic shield. An integrated circuit B containing the laser driving circuit is located inside the container. This integrated circuit is provided on its surface with a metal ground area D on which a laser diode E is mounted. This is secured to the ground area by means of an electrically conducting adhesive, for example silver-containing epoxy resin, so that the driving current can flow in the cathode. The ground area extends over the integrated circuit surface by means of metallization strips C, which act as thermal dissipation means for the laser.

The laser anode is connected by a bonding wire to a second metal area N, connected to the driving circuit within the integrated circuit.

The light-emitting surface of the laser is confronted by an optical fiber I with pig tail functions. Fiber I can easily be positioned in correspondence of the light-emitting surface thanks also to the help of a central metallization strip M, deposited on the surface of the integrated circuit and acting as a visual guide for the alignment.

The fiber is secured to the integrated circuit at a point F, to the metal container at a point L and to a fiber guiding device G at a point H by epoxy resin gluing.

Since the laser is mounted directly on the surface of the integrated circuit containing the driving circuit, as previously described, the problems due to the length of the bonding wires and to the passage through different connection sections realized with different techniques are minimized. A single, very short bonding wire is required between the upper metallized surface of the laser and the metal area connected to the output of the driving circuit.

Such mounting requires in any case good power dissipation, lacking which the laser would undergo overheating, which would compromise its correct operation. This thermal dissipation is guaranteed by the aforesaid metallization strips.

Another important factor, from the point of view of thermal balance, is constituted by the CMOS technology in which the driving circuit is realized. As is known, this technology is characterized by reduced power consumption.

Figure 2:
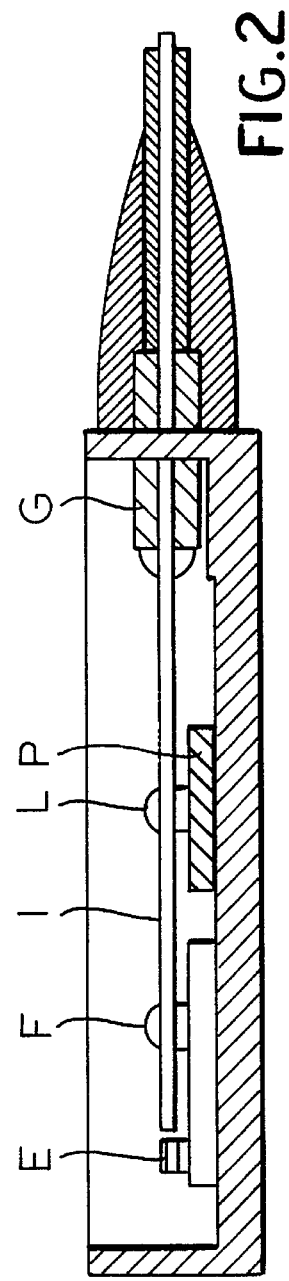

FIG. 2 highlights how the fiber is horizontally aligned to the emitting device thanks to a projecting portion P of the metal container, whose thickness is equal to that of the integrated circuit. Point L for securing the fiber, mentioned previously, is realized on this projecting portion.

The existence of a fiber securing point directly on the integrated circuit, near the laser diode, improves the efficiency and stability of the optical coupling in the presence of temperature variations and of mechanical stresses.

It is evident that what has been described is provided solely by way of non-limiting example. Variations and modifications are possible without departing from the scope of the invention.

We claim:

1. A transmitter module for optical interconnections, comprising:

a metal container;

an optical emitting device housed in said container and having an anode and a cathode;

an integrated circuit containing a driving circuit for the optical emitting device and received in said container;

an optical fiber outgoing from the container through a fiber guiding device; and mounting means in said container and including a first metal-ground area formed on said integrated circuit for mounting of said optical emitter device thereon, said optical emitting device having its cathode electrically connected to the first area and its anode connected to a second metal area connected with the output of the driving circuit, said optical fiber confronting the light-emitting surface of optical emitting device and being secured onto said integrated circuit.

2. A transmitter module for optical interconnections, comprising:

a metal container;

an optical emitting device housed in said container and having an anode and a cathode;

an integrated circuit containing a driving circuit for the optical emitting device and received in said container;

an optical fiber outgoing from the container through a fiber guiding device; and mounting means in said container and including a first metal-ground area formed on said integrated circuit for mounting of said optical emitter device thereon, said optical emitting device having its cathode electrically connected to the first area and its anode connected to a second metal area connected with the output of the driving circuit, said optical fiber confronting the light-emitting surface of optical emitting device and being secured onto said integrated circuit, said first ground area extending over the surface of the integrated circuit by means of metallization strips, acting as thermal dissipation means for said optical emitting device.

3. A transmitter module for optical interconnections, comprising:

a metal container;

an optical emitting device housed in said container and having an anode and a cathode;

an integrated circuit containing a driving circuit for the optical emitting device and received in said container;

an optical fiber outgoing from the container through a fiber guiding device; and mounting means in said container and including a first metal-ground area formed on said integrated circuit for mounting of said optical emitter device thereon, said optical emitting device having its cathode electrically connected to the first area and its anode connected to a second metal area connected with the output of the driving circuit, said optical fiber confronting the light-emitting surface of optical emitting device and being secured onto said integrated circuit, a central metallization strip being formed on a surface of the integrated circuit and acting as a visual guide for aligning said optical fiber with the light-emitting surface of the optical emitting device.

4. A transmitter module for optical interconnections, comprising:

a metal container;

an optical emitting device housed in said container and having an anode and a cathode;

an integrated circuit containing a driving circuit for the optical emitting device and received in said container;

an optical fiber outgoing from the container through a fiber guiding device; and mounting means in said container and including a first metal-ground area formed on said integrated circuit for mounting of said optical emitter device thereon, said optical emitting device having its cathode electrically connected to the first area and its anode connected to a second metal area connected with the output of the driving circuit, said optical fiber confronting the light-emitting surface of optical emitting device and being secured onto said integrated circuit, said optical fiber being further secured to the metal container on a projecting portion, whose thickness is equal to that of the integrated circuit, and to the fiber guiding device.

* * * * *